United States Patent
Oh et al.

(10) Patent No.: US 8,433,019 B2
(45) Date of Patent: Apr. 30, 2013

(54) SYSTEM AND APPARATUS FOR SYNCHRONIZATION BETWEEN HETEROGENEOUS PERIODIC CLOCK DOMAINS, CIRCUIT FOR DETECTING SYNCHRONIZATION FAILURE AND DATA RECEIVING METHOD

(75) Inventors: Myeong Hoon Oh, Daejeon (KR); Seong Woon Kim, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 381 days.

(21) Appl. No.: 12/825,919

(22) Filed: Jun. 29, 2010

(65) Prior Publication Data

US 2011/0022934 A1    Jan. 27, 2011

(30) Foreign Application Priority Data

Jul. 24, 2009    (KR) ........................ 10-2009-0067864
Mar. 18, 2010   (KR) ........................ 10-2010-0024315

(51) Int. Cl.
    *H04L 7/00*    (2006.01)
(52) U.S. Cl.
    USPC ........................................................ 375/354
(58) Field of Classification Search .................. 375/354, 375/355, 356, 357
    See application file for complete search history.

(56) References Cited

U.S. PATENT DOCUMENTS

| 6,658,073 | B1 | 12/2003 | Grunert |
| 7,020,791 | B1 * | 3/2006 | Aweya et al. ................. 713/400 |
| 7,130,368 | B1 * | 10/2006 | Aweya et al. ................. 375/376 |

FOREIGN PATENT DOCUMENTS

| JP | 5-48591 | 2/1993 |
| JP | 8-54957 | 2/1996 |
| JP | 2001-148686 | 5/2001 |
| JP | 2003-516092 | 5/2003 |
| JP | 2005-109955 | 4/2005 |
| JP | 2009-33553 | 2/2009 |
| KR | 10-2004-0008835 B1 | 1/2004 |
| KR | 10-2007-0069366 B1 | 7/2007 |

* cited by examiner

*Primary Examiner* — Don N Vo
(74) *Attorney, Agent, or Firm* — Kile Park Goekjian Reed & McManus PLLC

(57) ABSTRACT

The present invention relates to a system and an apparatus for synchronization between heterogeneous periodic clock domains, a synchronization failure detecting circuit, and a data receiving method. The synchronization system between heterogeneous periodic clock domains including a sender and a receiver operated according to heterogeneous periodic first clock and second clock, respectively, includes: a sender that outputs a prediction clock obtained by delaying the first clock for a first time; and a receiver that predicts success and failure of synchronization between the first clock and the second clock by using the prediction clock and selectively delays the second clock for a second time according to the predicted results to synchronize the second clock with the first clock.

18 Claims, 6 Drawing Sheets

NO SYNCHRONIZATION FAILURE DETECTION

NO SYNCHRONIZATION FAILURE DETECTION

SYNCHRONIZATION FAILURE DETECTION

US 8,433,019 B2

SYSTEM AND APPARATUS FOR SYNCHRONIZATION BETWEEN HETEROGENEOUS PERIODIC CLOCK DOMAINS, CIRCUIT FOR DETECTING SYNCHRONIZATION FAILURE AND DATA RECEIVING METHOD

CROSS-REFERENCE TO RELATED APPLICATIONS

This application claims priority under 35 U.S.C. §119 to Korean Patent Application No. 10-2009-0067864, filed on Jul. 24, 2009, and Korean Patent Application No. 10-2010-0024315, filed on Mar. 18, 2010, in the Korean Intellectual Property Office, the disclosure of which are incorporated herein by reference in their entirety.

BACKGROUND OF THE INVENTION

1. Field of the Invention

The present invention relates to a system and an apparatus for synchronization capable of preventing performance degradation due to latency increase in multi-clock domain environment, a synchronization failure detecting circuit, and a data receiving method.

2. Description of the Related Art

In designing a system for a chip (SoC) using intellecture properties (IP), each IP may be operated at different clock frequencies. When designing to integrate different IPs, synchronization failure in transmitting data between the IPs should be considered. For example, when all the IPs are operated by a single clock in order to meet the IPs operated at the lowest clock frequency, synchronization is guaranteed but causes performance degradation. The clock period of each IPs is controlled to have an integer multiple relations, which can prevent performance degradation while using a relatively easier synchronization method, as compared with a single clock-based synchronization method. However, in order to control integer multiple relation between the clocks, the number of IPs should be increased or the difference in the inter-IP optimized clock frequencies should be increased, such that the application fields of the synchronization method are greatly reduced.

In order to resolve the problem of synchronization failure, various synchronization methods have been proposed.

A "synchronous" method is commonly assumed to mean "synchronous" circuit-based and it is assumed that the clock characteristics over the entire area in a chip should be the same. A "mesochronous" method is assumed to mean the difference in the clock frequencies observed in chips is not allowed but the difference in phases is allowed. In other words, the mesochronous is based on the assumption that only the delay time from the clock source to two specific leaf nodes is different, and the delay elements controlling the clocks or the data transfer speed should be used for synchronization. Meanwhile, a "plesiochronous" method recognizes the difference in fine frequencies and thus, the phases can be also changed. This means the "plesiochronous" method is based on the assumption that it repeatedly performs synchronization using the "mesochronous" method.

"Related" is based on the assumption that two points of the clock frequency in a chip has the integer multiple relations. By following the above based assumptions, synchronization failure cases can be easily predicted by the characteristic analysis of the clock frequency. At this time, a "heterogeneous" method uses the synchronous failure predicting method that variously specializes the clock frequency without using the integer multiple relations between the clock frequencies. An "asynchronous" method is based on the assumption including all the foregoing assumptions, but requires a synchronization apparatus based on an asynchronous design method for the synchronization.

The "synchronous", "mesochronous", and "plesiochronous" methods are classified under the single clock environment while the "related", "heterogeneous", and "asynchronous" assumptions are classified under the personal multi-clock environment when the clock sources are in plural. The methods up to the "heterogeneous" methods should maintain the periodicity of all the clocks.

SUMMARY OF THE INVENTION

It is an object of the present invention to provide an apparatus and a system for synchronization capable of resolving synchronization failure that occurs in transmitting data between heterogeneous clock domains having a plurality of periodic clocks without latency, a synchronization failure detecting circuit, and a data receiving method.

The present invention is not limited to the above-mentioned objects and other objects not mentioned above can be obviously understood to those skilled in the art from the following description.

According to an embodiment of the present invention, there is provided a synchronization system between heterogeneous periodic clock domains including a sender and a receiver operated according to heterogeneous periodic first clock and second clock, respectively, including: a sender that outputs a prediction clock obtained by delaying the first clock for a first time; and a receiver that predicts success and failure of synchronization between the first clock and the second clock by using the prediction clock and selectively delays the second clock for a second time according to the predicted results to synchronize the second clock with the first clock.

According to another embodiment of the present invention, there is provided a synchronization apparatus for performing synchronization between heterogeneous periodic first clock and second clock, including: a first sampling unit that receives a prediction clock obtained by delaying the first clock for the first time and samples the prediction clock in response to the first delay signal obtained by delaying the second clock for the hold time of the first clock; a second sampling unit that samples the prediction clock in response to the second delay signal obtained by delaying the second clock by subtracting the setup time of the first clock from the period of the second clock; a detector that samples the results sampled by the first and second sampling units, respectively, with the first and second clocks, respectively, and compares the sampled results with the second clock to detect the success and failure of synchronization between the first and second clocks; and a synchronizer that selectively delays the second clock for the second time according to the detected results to synchronize the second clock with the first clock.

According to another embodiment of the present invention, there is provided a synchronization failure detecting circuit detecting success and failure of synchronization between a first clock and a second clock, including: a first sampling unit that that samples the first clock in response to a first delay signal obtained by delaying the second clock for a hold time of the first clock; a second sampling unit that samples the first clock in response to a second delay signal obtained by delaying the second clock by subtracting a setup time of the first clock from a period of the second clock; and a detector that detects whether the results sampled by the first and second sampling unit are different from each other.

According to another embodiment of the present invention, there is provided a data receiving method from a heterogeneous periodic clock domain receiving data to a second clock domain operated according to a second clock having a period different from a period of a first clock from a first clock domain operated according to the first clock, including: receiving a prediction clock that delays the first clock from the first clock domain by a first time; and predicting success and failure of synchronization between the first clock and the second clock using the prediction clock, if it is determined that synchronization fails, delaying the second clock for second time, and sampling the data in response to the second clock delayed by the second time.

The detailed matters of other embodiments will be described in more detail with reference to the detailed description and drawings.

With the present invention, it can predict whether synchronization between the heterogeneous clock domains fails and avoid synchronization failure without latency.

DETAILED DESCRIPTION OF THE PREFERRED EMBODIMENTS

Figure 1:
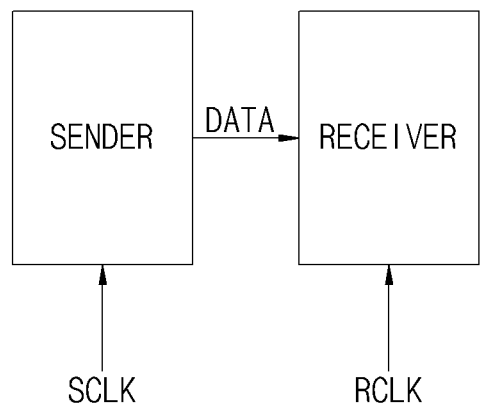
FIG. 1 is a block diagram showing a general system including a sender and a receiver.

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Meanwhile, terms used in the present invention are to explain exemplary embodiments rather than limiting the present invention. In the specification, a singular type may also be used as a plural type unless stated specifically. "Comprises" and/or "comprising" used herein does not exclude the existence or addition of one or more other components, steps, operations and/or elements.

Hereinafter, exemplary embodiments of the present invention will be described with reference to the accompanying drawings. Like reference numerals refer to components having like configurations and functions throughout the drawings.

A synchronization failure detecting circuit according to an exemplary embodiment of the present invention will be described with reference to FIGS. 1 to 3. FIG. 1 is a block diagram showing a general system including a sender and a receiver, FIG. 2 is a circuit diagram showing a synchronization failure detecting circuit according to an exemplary embodiment, and FIG. 3 is a signal diagram for explaining an operation of the synchronization failure detecting circuit of FIG. 2.

As shown in FIG. 1, the sender and the receiver are operated by different clock domains. That is, the sender is operated according to a first clock sclk and the receiver is operated according to a second clock rclk. Herein, even though the first clock sclk and the second clock rclk are different from each other, they are still considered as periodic signals. Since the sender is operated according to the first clock sclk and outputs data, the data is synchronized with the first clock sclk. However, since the sender and the receiver are operated by different clock domains, the receiver operated by the second clock rclk may fail synchronization with the first clock sclk.

Figure 2:
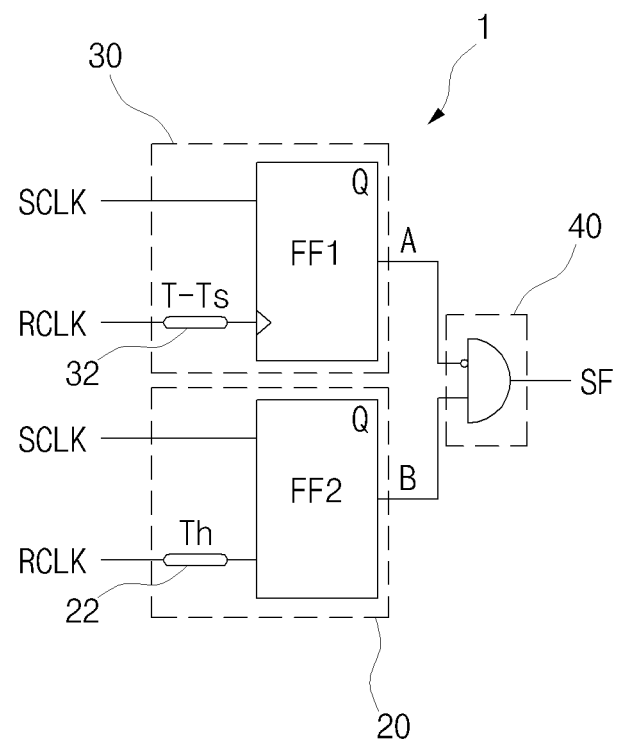
FIG. 2 is a circuit diagram showing a synchronization failure detecting circuit according to an exemplary embodiment of the present invention.

The success and failure of synchronization by the receiver can be detected through the synchronization failure detection circuit as shown in FIG. 2.

The synchronization failure detecting circuit 1 can determine the success and failure of synchronization by sampling the first clock sclk with a signal (or a signal that leads the second clock rclk by a setup time of the first clock sclk) that delays the second clock rclk by T−Ts (T: a period of the second clock rclk, Ts: a setup time of the first clock sclk) and a signal that delays the second clock rclk by Th (Th: a hold time of the first clock sclk), respectively. When the second clock rclk is delayed by T−Ts and Th, respectively, a window is generated by a hazard section of the first clock sclk and the second clock rclk is generated in this window section.

The synchronization fail detecting circuit 1 includes a first sampling unit 20, a second sampling unit 30, and a detector 40 as shown in FIG. 2. The first and second sampling units 20 and 30 each include delayers 22 and 32 and flip-flops FF1 and FF2.

The first sampling unit 20 samples the first clock sclk in response to a signal that delays the second clock rclk by Th and the second sampling unit 30 samples the first clock sclk in response to a signal that delays the second clock rclk by T−Ts. Specifically, the first delayer 22 delays the second clock rclk by Th and the first flip-flop FF1 samples the first clock sclk in response to the second clock rclk delayed by the first delayer 22. The second delayer 32 delays the second clock rclk by T−Ts and the second flip-flop FF2 samples the first clock sclk in response to the second clock rclk delayed by the second delayer 32.

The detector 40 compares each sampling result of the first and second sampling units 20 and 30 to detect the success and failure of synchronization between the first clock sclk and the second clock rclk.

The operation of the synchronization failure detecting circuit 1 will be described in more detail with reference to FIG. 3.

Figure 3A:
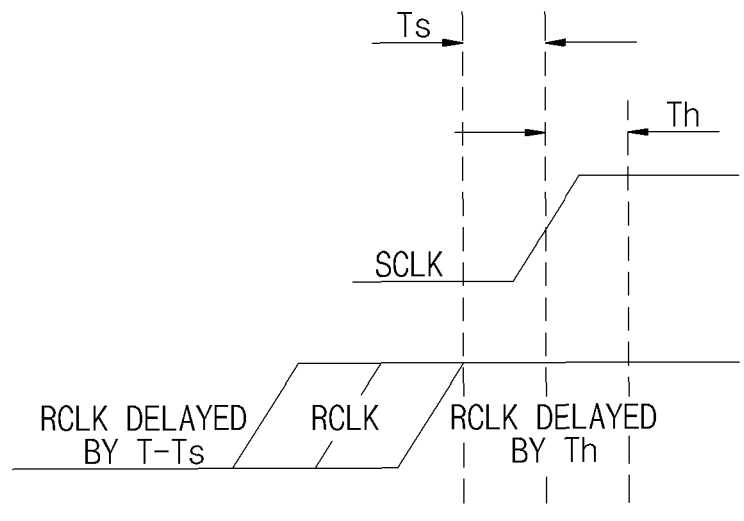
FIG. 3 is a signal diagram for explaining an operation of the synchronization failure detecting circuit.
Figure 3B:
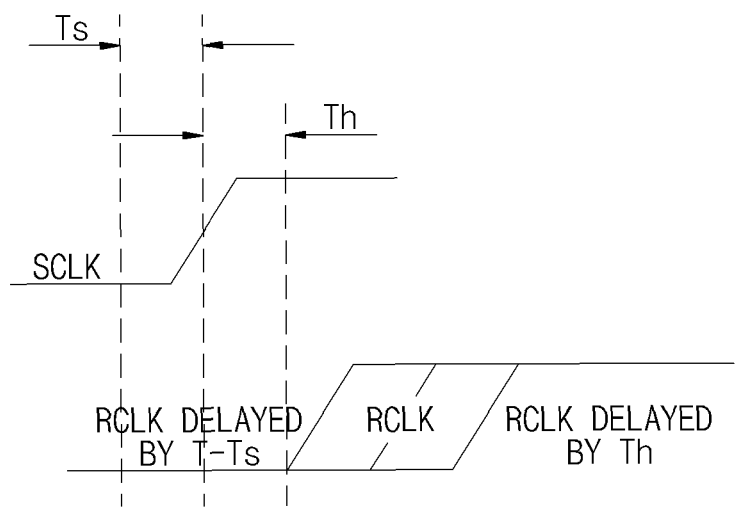
Figure 3C:
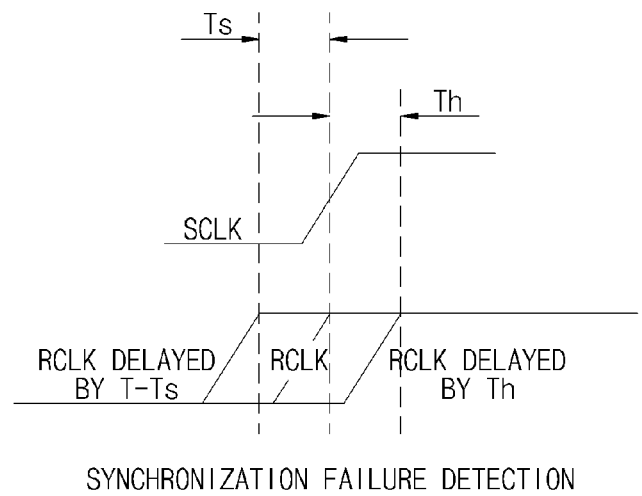

As shown in FIGS. 3A and 3B, when the first and second sampling units 20 and 30 of FIG. 2 sample the same value, it shows that synchronization does not fail. In FIG. 3A, values of nodes A and B shown in FIG. 2 become '0' and in FIG. 3B, the values of nodes A and B become '1'. However, as shown in FIG. 3C, when node A is '0' and node B is '1', the second clock rclk exists in the hazard section of the first clock sclk, which shows that synchronization fails. Therefore, when the sampling results of the first and second sampling units 20 and 30 are different from each other, the detector 40 of FIG. 2 detects synchronization failure and when the sampling results of the first and second sampling units 20 and 30 are the same, it does not detect synchronization failure.

The detector 40 includes an AND operator to invert the sampling result of any one of the first and second sampling units 20 and 30 and execute the AND operation with other sampling results. However, the detector 40 is not limited thereto and may be implemented by various forms. For example, the detector 40 may be constituted by an exclusive-OR gate (XOR gate).

Although the success and failure of synchronization can be detected by the synchronization failure detecting circuit 1 of FIG. 2, if the success and failure of synchronization is previously determined, then the correct data cannot be transmitted. Therefore, if the first clock sclk delayed by a predetermined time instead of the first clock sclk is input to the synchronization failure detecting circuit 1 of FIG. 2, the synchronization failure can be previously predicted before several cycles of the second clock rclk, thereby making it possible to previously prevent synchronization failure.

Figure 4:
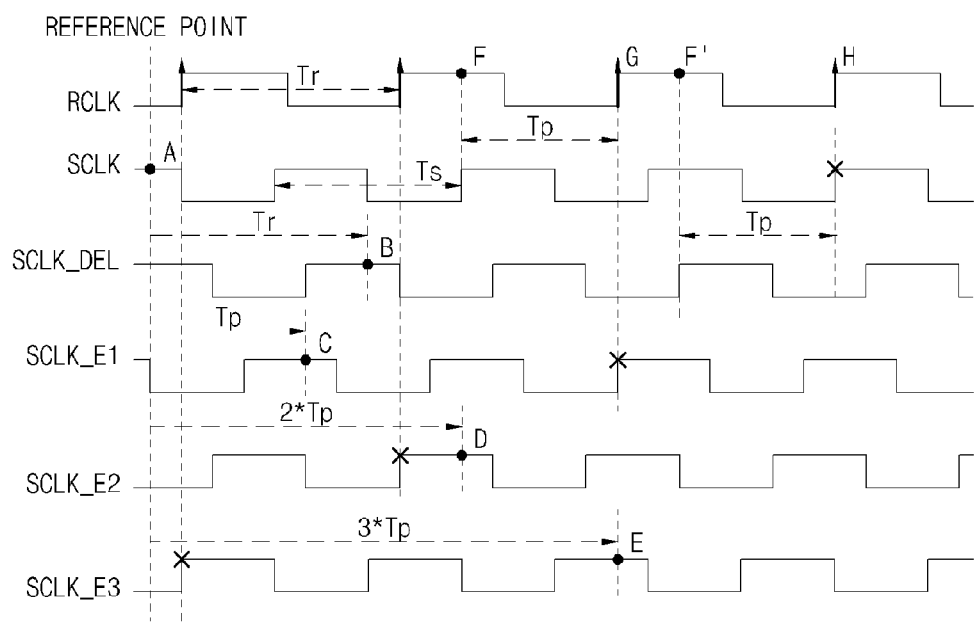
FIGS. 4 and 5 are signal diagrams for explaining how much time the first clock sclk is delayed to previously predict synchronization failure before several cycles of the second clock rclk.
Figure 5:
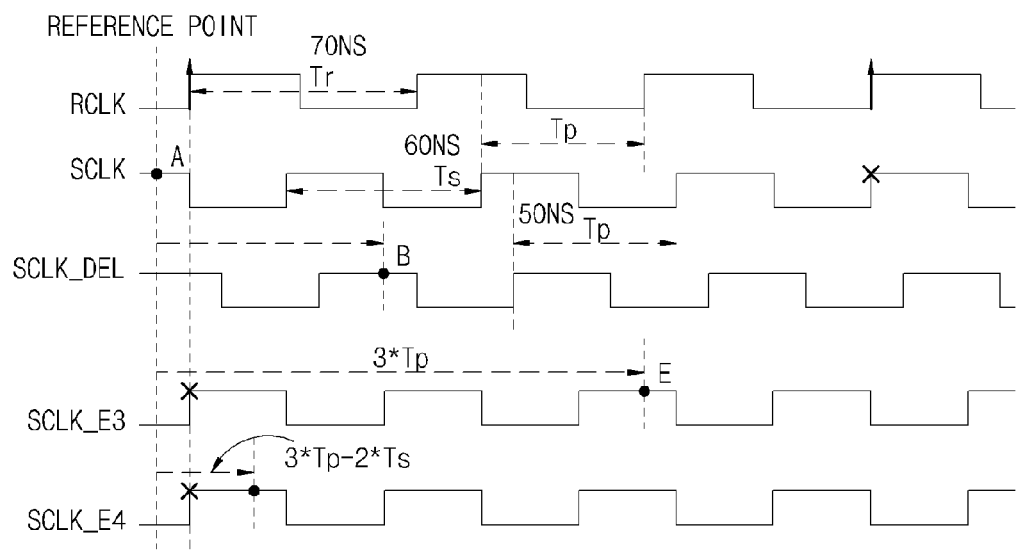

Hereinafter, FIGS. 4 and 5 show how much time the first clock sclk is delayed to previously predict synchronization failure before several cycles of the second clock rclk.

FIGS. 4 and 5 are signal diagrams for explaining how much time the first clock sclk is delayed to previously predict synchronization failure before several cycles of the second clock rclk.

The time set for rising edges of free running signals having period T is assumed to be F and the time set for rising edges of signals that delays F by time t is assumed to be delF(t) Substantially, even when the free running signals having period T is delayed or led by T, it has the time set for the same rising edges, such that F may be represented as follows.

$$F=\text{del}F(nT), (n=\ldots,-3,-2,-1,0,1,2,3,\ldots) \quad (1)$$

Therefore, delF(t) may be represented as follows.

$$\text{del}F(t)=\text{del}F(nT+t), (n=\ldots,-3,-2,-1,0,1,2,3,\ldots) \quad (2)$$

The equations of (n<0) of delF(nT) and (−nT+t)<0 of delF (−nT+t) represent that the semantics signals are led by a predetermined time.

FIG. 4 shows whether the state of the first clock sclk before several cycles of the second clock rclk can be predicted by assuming the second clock rclk having period Tr and the first clock sclk having period Ts and delaying the first clock sclk for the predetermined time. The synchronization failure phenomenon with the first clock sclk appears at the fourth rising edge H of the second clock rclk. Predicting the success and failure of synchronization at H and at G that precedes the fourth rising edge H of the second clock rclk as much as one cycle can be achieved by delaying the first clock sclk for Tp from F to G. Meanwhile, the relationship between the first clock sclk_del delayed by the period Tr of the second clock rclk and the second clock rclk is the same as the relationship between the second clock rclk before one cycle and the first clock sclk. Therefore, as shown in FIG. 4, the time from F' to H at the signal sclk_del that delays the first clock sclk by Tr (see point A to point B) is the same as Tp. However, Tp is the same as the difference in phase between the first clock sclk and the first clock sclk_del delayed by Tr. In other words, the difference in phase between the first clock sclk_del delayed by Tr and the first clock sclk is Tp and in the sclk_e1 signal that is a signal obtained by delaying the first clock sclk for Tp (see point A to point C), the synchronization failure phenomenon appears one cycle before the fourth cycle of the second clock rclk, that is, third cycle G.

The sclk_e2 and sclk_e3 signals are each a signal that delays the first clock sclk by double Tp and three-fold Tp. Consequently, the synchronization failure phenomenon appears before each of two cycles and three cycles from the fourth cycle H of the second clock rclk showing the synchronization failure phenomenon between the first clock sclk and the second rclk and thus, the synchronization failure phenomenon can be predicted. This shows that the success and failure of synchronization can be predicted before several cycles according a predetermined rule.

That is, when the sclk_e1, sclk_e2, and sclk_e3 signals instead of the first clock sclk are input to the synchronization failure detecting circuit 1 of FIG. 2, the success and failure of synchronization can be predicted before Tr, 2*Tr, and 3*Tr, respectively (sclk_e1, sclk_e2, and sclk_e3 signals are hereinafter referred to as the prediction clock).

When implementing the circuit previously predicting the success and failure of synchronization, a delay element is used to delay specific signals. However, if the delay time is longer, the delay time is difficult to design and additional side effects such as power consumption occur. Thus, if the delay time is shortened, then at the same time, the same effect can be obtained, by using the characteristics of periodic signals according to Equations (1) and (2).

In FIG. 4, when the signal obtained by delaying the first clock sclk for 3*Tp, that is, the prediction clock sclk_e3 is applied to Equation (2), it may be represented as follows.

$$\text{del}F\text{sclk}(3Tp)=\text{del}F\text{sclk}(nTs+3Tp), (n=\ldots,-3,-2,-1,0,1,2,3,\ldots) \quad (3)$$

The minimum n, (n=... −3, −2, −1, 0, 1, 2, 3, ... ) values satisfying $$nTs+3Tp \geqq 0 \quad (4)$$

can be determined. At this time, the nTs+3Tp value is the minimum delay time of the same free running signal as the signal obtained by delaying sclk for 3*Tp.

Specifically describing with reference to FIG. 5, if Tr and Ts are each 70 ns and 60 ns, respectively, Tp becomes 50 ns. At this time, n satisfying nTs+3Tp≧0 is determined to be n≧−2.5, that is, −2. In conclusion, predicting synchronization failure before 3 cycles based on the second clock rclk can be achieved by delaying the first clock sclk for 3*Tp but uses the signal having the same waveform as the prediction clock sclk_e3 obtained by delaying the first clock sclk for 3*Tp in order to make the delay time minimum. In other words, when using the prediction clock sclk_e4 obtained by delaying the first clock sclk for 3Tp−2Ts=3*50ns−2*60=30 ns, the delay time may be minimized when implementing the circuit, such that the design of the delay time is simplified and power consumption can be reduced. The description of the clock predictor generating the prediction clock sclk_e4 will be described below with reference to FIG. 7.

Figure 6:
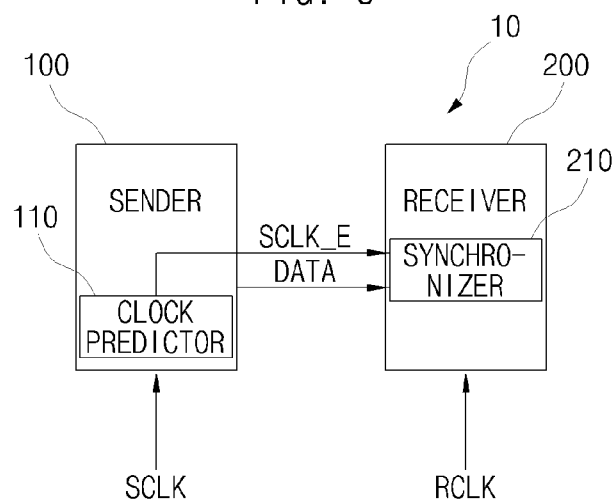
FIG. 6 is a block diagram showing a synchronization system between heterogeneous periodic domains according to an exemplary embodiment of the present invention.
Figure 7:
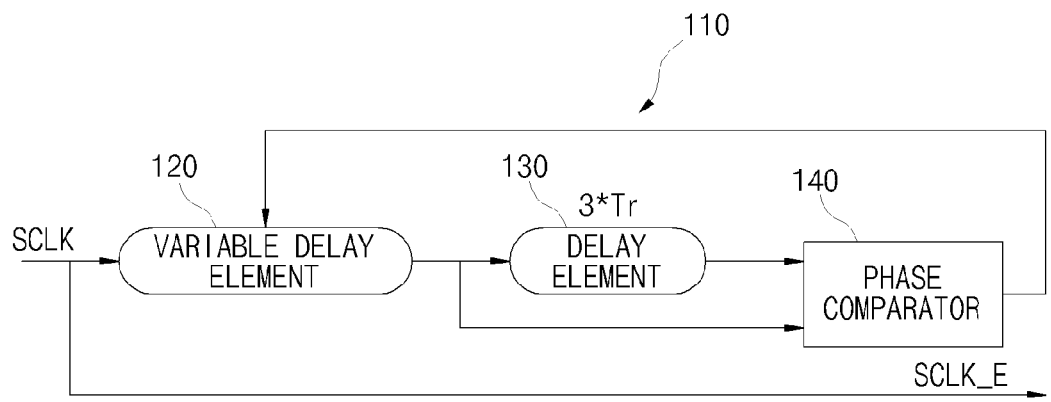
FIG. 7 is a block diagram showing a clock predictor shown in FIG. 6.
Figure 8:
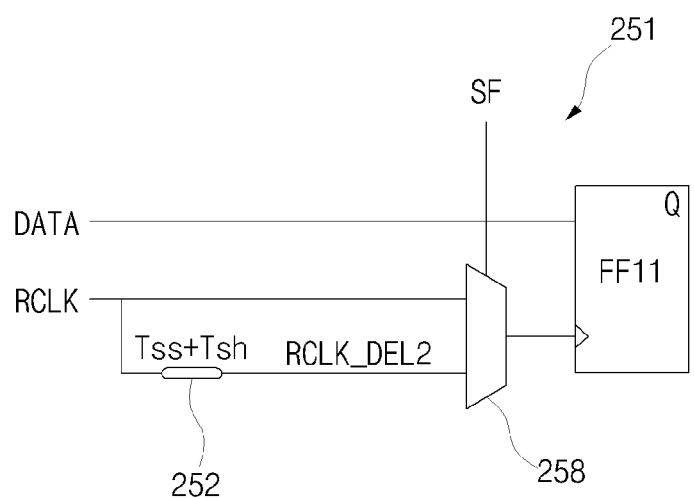
FIG. 8 is an exemplary circuit diagram showing a synchronizer shown in FIG. 6.

The synchronization method according to the exemplary embodiment of the present invention will be described with reference to FIGS. 6 to 8. FIG. 6 is a block diagram showing the synchronization method between the heterogeneous period domains according to the exemplary embodiment, FIG. 7 is a block diagram showing a clock predictor shown in FIG. 6, and FIG. 8 is an exemplary circuit diagram showing the synchronizer shown in FIG. 6.

FIG. 6 shows an uppermost block diagram for synchronization in the heterogeneous environment. A synchronization system 10 includes a sender 100 and a receiver 200 and the sender 100 includes a clock predictor 110 and a receiver 200 includes a synchronizer 210.

In order to detect the above-mentioned synchronization failure, the clock predictor 110 delays the first clock sclk by a predetermined time and generates the prediction clock sclk_e. The sender 100 outputs the prediction clock sclk_e and data to the receiver 200.

The synchronizer 210 of the receiver 200 serves to previously detect the synchronization failure in order to avoid such occurrence.

Referring first to FIG. 7, the clock predictor 110 in the sender 100 will be described in detail.

The clock predictor 110 includes a variable delay element 120, a fixed delay element 130, and a phase comparator 140.

The variable delay element 120 delays and outputs the first clock sclk at variable times according to the feedback of the phase comparator 140. The fixed delay element 130 delays and outputs the first clock sclk delayed by the variable delay element 120 by the previously predicted time, for example, 3 period (3*Tr). The phase comparator 140 compares the phase between the output of the variable delay element 120 and the first clock sclk and feedback the compared results to the variable delay element 120.

For example, the variable delay element 120 initially outputs the first clock sclk without delaying and the fixed delay element 1030 delays the first clock sclk for 3*Tr. The phase comparator 140 compares the phase between the clock sclk and the first clock sclk delayed by 3*Tr by the fixed delay element 130. If it is determined that the phases are not identical with each other according to the compared results, it is fedback to the variable delay element 120. The variable delay element 120 delays and outputs the first clock sclk by a predetermined time according to the feedback and the fixed variable element delays and output the signal output from the variable delay element 120 as much as 3*Tr. The phase comparator 140 again compares the phase between the first clock sclk and the signal output from the fixed variable element and feedbacks the compared results to the variable delay element 120.

In this configuration, the delay time is added to the variable delay element 120 until there is no difference in phases in the phase comparator 140; and consequently, when there is no difference in phases in the phase comparator 140, the prediction clock sclk_e is generated by delaying the sclk for the delay time of the variable delay element 120 at that time and output. Herein, the output prediction clock sclk_e may be, for example, the prediction clock (sclk_e4) of FIG. 5.

Meanwhile, the synchronizer 210 includes the synchronization failure detecting circuit 1 having a structure shown in FIG. 2 and detects the success and failure of synchronization. Synchronization failure is previously predicted by receiving the prediction clock sclk_e and when synchronization fails, the second clock rclk is delayed by the predetermined time and is synchronized with the first clock sclk and data received according to the second clock rclk_del2 is delayed by the predetermined time. When synchronization does not fail, the synchronizer 210 receives data according to the second clock rclk. One example of the synchronizer 210 will be described in detail with reference to FIG. 8.

Referring to FIG. 8, the synchronizer 210 includes a first sampling unit 220, a second sampling unit 230, and a detector 240, and a synchronizer 250.

First, the first sampling unit 220 includes a first delayer 222 that delays the second clock rclk by a hold time TsH of the first clock sclk and outputs a first delay signal rclk_del0 and first and second flip-flops FF1 and FF2 that are connected in series and are operated in response to the first delay signal rclk_del0. The first flip-flop FF1 samples the prediction clock sclk_e in response to the first delay signal rclk_del0 and the second flip-flop FF2 samples the output sclk_e_s0A of the first flip-flop FF1 in response to the first delay signal rclk_del0.

The second sampling unit 230 includes a second delayer 232 that delays (or, leading the second clock rclk by the setup time of the first clock sclk) the second clock rclk by time subtracting the setup time of the first clock sclk from the period Tr of the second clock rclk to output the second delay signal rclk_del1 and third and fourth flip-flops FF3 and FF4 that are connected in series and are operated in response to the second delay signal rclk_del1. The third flip-flop FF3 samples the prediction clock sclk_e in response to the second delay signal rclk_del1 and the fourth flip-flop FF4 samples the output sclk_e_s1A of the third flip-flop FF3 in response to the second delay signal.

The first and second sampling units 220 and 230 of FIG. 8 are blocks corresponding to the first and second sampling units 20 and 30 shown in FIG. 2. However, since the first and second delay signals rclk_del0 and rclk_del1 are asynchronized with the prediction clock sclk_e, the synchronization method of a double-latch concept that connects storage devices FF1, FF2, FF3, and FF4 in series is used.

Meanwhile, as shown in FIG. 2, the detector 240 compares each sampled results sclk_e_s0B, and sclk_e_s1B of the first and second sampling units 220 and 230 to detect the success and failure of the synchronization. However, an example shown in FIG. 8 synchronizes the first and second sampling results sclk_e_s0B, sclk_e_s1B with the second clock rclk through fifth to eighth flip-flops FF5, FF6, FF7, and FF8 and then detects the success and failure of synchronization. The reason will be described. In FIG. 8, the first sampling unit 220 is in a first clock domain Domain 1 and the second sampling unit 230 is in a second clock domain Domain 2. However, since the success and failure of synchronization is determined by the synchronization failure detecting unit 240 of a third domain Domain 3 that is operated at the second clock rclk, each sampling result sclk_e_s0B and, sclk_e_s1B of the first and second sampling units 220 and 230 that are the input of the synchronization failure detecting unit 240 may be synchronized with the second clock rclk. Synchronizing each sampling result sclk_e_s0B and, sclk_e_s1B of the first and second sampling units 220 and 230 with the second clock rclk is to reduce the synchronization failure probability due to the transmission between different clock domains Domain 1 and Domain 3 and Domain 2 and Domain 3.

Therefore, the detector 240 includes the fifth to eighth flip-flops FF5, FF6, FF7, and FF8 in the synchronization manner of the double-latch form similar to the first and second sampling units 220 and 230. The sixth and eighth flip-flops FF6 and FF8 sample the outputs sclk_e_S02A and sclk_e_S12A of the fifth and seventh flip-flops FF5 and FF7, respectively, in response to the second clock rclk.

The detector 240 includes, for example, the AND operator to compare the outputs sclk_e_S02B and sclk_e_S12B of the sixth and eighth flip-flops FF6 and FF8, thereby detecting the success and failure of synchronization between the first and second clocks sclk and rclk. If the outputs sclk_e_S02B and sclk_e_S12B of the sixth and eighth flip-flops FF6 and FF8 are different from each other, that is, the sampling results of the first and second sampling units 220 and 230 are different from each other, the detector 240 determines that the synchronization fails. If the outputs sclk_e_S02B and sclk_e_S12B of the sixth and eighth flip-flops FFs are the same, that is, the sampling results of the first and second sampling units 220 and 230 are the same, the detector 240 determines that synchronization has not failed. In the example of synchronization failure, sclk_e_S02B in FIG. 8 corresponds to a signal '1' sampled behind sclk rising in FIG. 3C and sclk_e_S12B corresponds to a signal '0' sampled before sclk rising in FIG. 3C. The success and failure of synchronization can be determined through the AND gate using two signals.

If it is determined that synchronization does not fail, the first and second (clocks?) determines that clocks sclk and rclk are synchronized. The synchronizer 250 samples and receives data with the second clock rclk.

If it is determined that synchronization fails, it means that the first and second clocks sclk and rclk are not synchronized with each other. The synchronizer 250 delays the second clock rclk by the predetermined time, for example, the time adding the setup time Tss and the hold time Tsh of the first clock sclk. In other words, when synchronization fails, data are sampled with the signal rclk_del2 having the maximum delay time in order to avoid synchronization failure and then, are received, thereby making it possible to stably receive data.

The synchronizer 250 includes a third delayer 252, a ninth flip-flop FF9, a tenth flip-flop FF10, and a selector 254, as shown in FIG. 8.

The third delayer 252 outputs the signal rclk_del2 by delaying the second clock rclk for the time adding the setup time Tss of the first clock sclk and the hold time Tsh rclk_del2. The ninth flip-flop FF9 samples data with the second clock rclk. The tenth flip-flop FF10 samples data with the signal rclk_del 2 delayed by the third delayer 252. The selector 254 selects any one of the ninth flip-flop FF9 and the tenth flip-flop FF10 according to the output SF of the detector 240 and outputs the sampled data data_s.

The synchronizer 210 can generally appreciate the success and failure of data synchronization through a total of 3-state pipeline by adding the flip-flops FF0 and FF1 for synchronization failure detecting input one by one and the flip-flops FF2 and FF4 and FF5 and FF7 necessary for two double-latch synchronizations two by two. Therefore, when the synchronizer 210 shown in FIG. 8 is used in the sender 200, the clock predictor 110 in the sender should generate the prediction clock sclk_3 so that the detector 240 predicts the success and failure of synchronization before 3 cycles (3 periods) based on the second clock rclk. Therefore, the fixed delay element 130 in the clock predictor delays the first clock sclk for 3*Tr.

Figure 9:
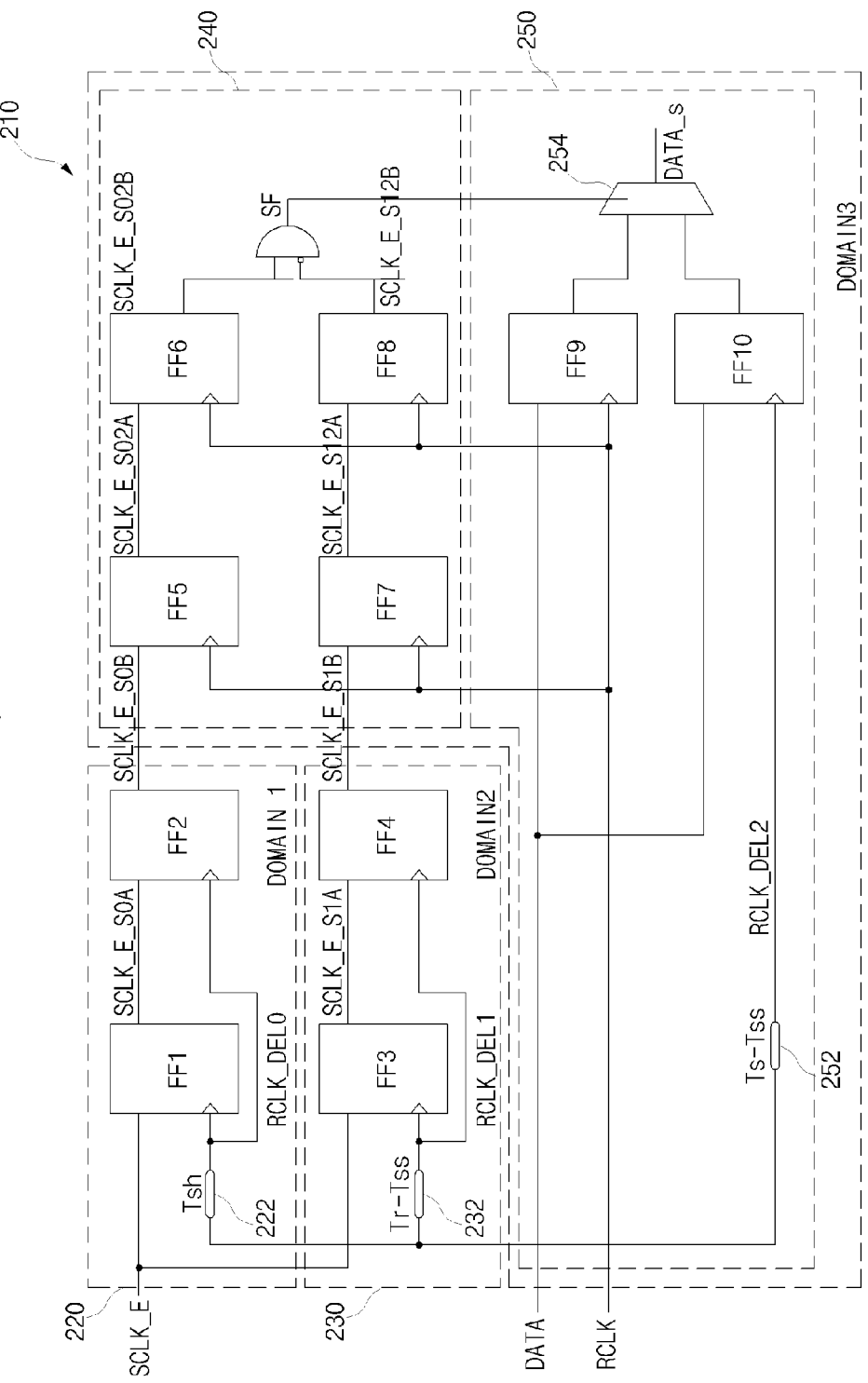
FIG. 9 is a circuit diagram showing a modified example of a synchronizer of FIG. 6.

FIG. 9 is a circuit diagram showing a modified example of the synchronizer 250 of FIG. 8.

Referring to FIG. 9, the synchronizer 251 includes a selector 254 that selects any one of the second clock rclk and the signal rclk_del2 obtained by delaying the second clock rclk for the time adding the setup time Tss and the hold time Tsh of the first clock sclk and an eleventh flip-flop FF11 sampling data in response to any one of the selected signals. The selector 258 may be implemented by a MUX.

While certain embodiments have been described above, it will be understood to those skilled in the art that the embodiments described are by way of example only. Accordingly, the embodiments described herein are provided by way of example only and should not be construed as being limited. It is to be understood that the invention is not limited to the disclosed embodiments, but, on the contrary, is intended to cover various modifications and equivalent arrangements included within the spirit and scope of the appended claims.

What is claimed is:

1. A synchronization method between heterogeneous periodic clock domains including a sender and a receiver operated according to heterogeneous periodic first clock and second clock, respectively, comprising:

a sender that outputs a prediction clock generated by delaying the first clock for a first time; and a receiver that predicts success and failure of synchronization between the first clock and the second clock by using the prediction clock and selectively delays the second clock for a second time according to the predicted results to synchronize the second clock with the first clock, wherein the receiver detects the success and failure of synchronization between the prediction clock and the second clock to previously predict synchronization failure preceding the time when the synchronization failure between the first clock and the second clock actually occurs by a predetermined time.

2. The synchronization system between heterogeneous periodic clock domains according to claim 1, wherein the first time is determined according to the predetermined time to be previously predicted.

3. The synchronization system between heterogeneous periodic clock domains according to claim 1, wherein the sender includes a clock predictor that outputs the prediction clock, and the clock predictor includes:

a variable delay element that delays the first clock for variable time according to a feedback;

a fixed delay element that delays the first clock delayed by the variable delay element for time to be previously predicted; and a phase comparator that compares the first clock with phases between the outputs from the fixed delay element and feedbacks the compared results to the variable delay element, the variable delay element outputs the first clock delayed for the variable time as the prediction clock if it is determined that the phases are the same according to the compared results.

4. The synchronization system between heterogeneous periodic clock domains according to claim 1, wherein the receiver includes a synchronization failure detector that samples each prediction clock by using a signal obtained by delaying the second clock for a hold time of the first clock and a signal obtained by delaying the second clock by a time subtracting a setup time of the first clock from a period of the second clock and detects the success and failure of synchronization between the first and second clocks based on each sampled result.

5. The synchronization system between heterogeneous periodic clock domains according to claim 4, wherein the synchronization failure detector includes:

a first sampling unit that samples the prediction clock in response to the signal obtained by delaying the second clock for the hold time of the first clock;

a second sampling unit that samples the prediction clock in response to the signal obtained by delaying the second clock for time subtracting the setup time of the fist clock from the period of the second clock; and a detector that detects that the synchronization is fail when the sampling results of the first and second sampling units are different from each other.

6. The synchronization system between heterogeneous periodic clock domains according to claim 1, wherein the receiver includes a synchronizer that delays the second clock for a sum of the hold time and setup time of the first clock to synchronize the delayed second clock with the first clock when it is predicted that the synchronization between the first and second clocks fails.

7. The synchronization system between heterogeneous periodic clock domains according to claim 6, wherein the synchronizer includes:
- a first sampling unit that samples data synchronized and output with the first clock from the sender with the second clock;
- a delayer that delays the second clock for a sum of the hold time and setup time of the first clock;
- a second sampling unit that samples the data with a second clock delayed by the delayer; and
- a selector that selects any one of data sampled by the first sampling unit and data sampled by the second sampling unit.

8. A synchronous apparatus performing synchronization between heterogeneous periodic first clock and second clock, comprising:
- a first sampling unit that receives a prediction clock obtained by delaying the first clock for a first time and samples the prediction clock in response to the first delay signal obtained by delaying the second clock for the hold time of the first clock;
- a second sampling unit that samples the prediction clock in response to the second delay signal obtained by delaying the second clock by subtracting the setup time of the first clock from the period of the second clock;
- a detector that samples the results sampled by the first and second sampling units, respectively, with the first and second clocks, respectively, and compares the sampled results with the second clock to detect the success and failure of the synchronization between the first and second clocks; and
- a synchronizer that selectively delays the second clock by the second time according to the detected results to synchronize the second clock with the first clock.

9. The synchronous apparatus according to claim 8, wherein the synchronizer receives data synchronized and input with the first clock at the second clock delayed by the second time when it is expected to synchronization fails; and receives data synchronized and input with the first clock at the second clock when it is expected that the synchronization does not fail.

10. The synchronization apparatus according to claim 9, wherein the synchronizer includes:
- a third sampling unit that samples the data at the second clock delayed for the second time;
- a fourth sampling unit that samples the data at the second clock; and
- a selector that selects any one of the outputs of the third and fourth sampling units according to the detected results.

11. The synchronization apparatus according to claim 9, wherein the synchronizer includes:
- a selector that selects any one of the second clock and the second clock delayed for the second time according to the detected results; and
- a third sampling unit that samples the data in response to any one selected by the selector.

12. The synchronization apparatus according to claim 8, wherein the detector previously predicts synchronization failure preceding the timing when synchronization failure between the first clock and the second clock occurs by a predetermined time; and the first time is previously determined according to a predetermined time to be previously predicted.

13. The synchronization apparatus according to claim 8, wherein the second time is a sum of the hold time and setup time of the first clock.

14. A synchronization failure detecting circuit detecting success and failure of synchronization between a first clock and a second clock, comprising:
- a first sampling unit that samples the first clock in response to a first delay signal obtained by delaying the second clock for a hold time of the first clock;
- a second sampling unit that samples the first clock in response to a second delay signal obtained by delaying the second clock by subtracting a setup time of the first clock from a period of the second clock; and
- a detector that detects whether the results sampled by the first and second sampling unit are different from each other.

15. The synchronization failure detecting circuit according to claim 14, wherein the detector detects that the synchronization between the first and second clocks fails when the results sampled by the first and second sampling units are different from each other.

16. A data receiving method between heterogeneous periodic clock domains including a first clock domain and a second clock domain operated according to heterogeneous periodic first clock and second clock, respectively, comprising:
- receiving a prediction clock that delays the first clock from the first clock domain for a first time; and
- predicting success and failure of synchronization between the first clock and the second clock using the prediction clock, if it is determined that synchronization fails, delaying the second clock for a second time, and sampling the data in response to the second clock delayed for the second time,
- wherein the sampling the data includes previously predicting synchronization failure preceding the timing when synchronization failure between the first clock and the second clock actually occurs by a predetermined time by detecting the success and failure of synchronization between the prediction clock and the second clock.

17. The data receiving method according to claim 16, wherein the sampling the data includes:
- first sampling the prediction clock in response to a first delay signal delaying the second clock by a hold time of the first clock;
- second sampling the prediction clock in response to a second delay signal obtained by delaying the second clock by subtracting a setup time of the second clock at the period of the second clock; and
- predicting that the synchronization between the first clock and the second clock fails when they are different from each other by comparing each sampling result of the first and second sampling.

18. The data receiving method according to claim 16, wherein the first time is determined according to the predetermined time to be previously predicted, and the second time is a sum of the hold time and setup time of the first clock.

* * * * *